United States Patent
Rajagopal et al.

(10) Patent No.: US 9,256,509 B1
(45) Date of Patent: Feb. 9, 2016

(54) COMPUTING ENVIRONMENT ANALYZER (71) Applicant: VCE Company, LLC, Richardson, TX (US)

(72) Inventors: Sampath Rajagopal, Fremont, CA (US); John James Mulqueeney, Jr., San Bruno, CA (US); Jonathan Streete, San Jose, CA (US)

(73) Assignee: VCE Company, LLC, Richardson, TX (US)

( * ) Notice: Subject to any disclaimer, the term of this patent is extended or adjusted under 35 U.S.C. 154(b) by 57 days.

(21) Appl. No.: 13/959,008

(22) Filed: Aug. 5, 2013

(51) Int. Cl.
G06F 9/44 (2006.01)
G06F 11/36 (2006.01)

(52) U.S. Cl.
CPC ............ *G06F 11/3604* (2013.01); *G06F 11/36* (2013.01)

(58) Field of Classification Search
CPC ....................................... G06F 11/36

USPC .......................................... 717/124
See application file for complete search history.

(56) References Cited

U.S. PATENT DOCUMENTS

| 7,926,036 | B2 * | 4/2011 | Nagappan et al. | 717/124 |
| 2003/0229890 | A1 * | 12/2003 | Lau et al. | 717/168 |
| 2010/0257513 | A1 * | 10/2010 | Thirumalai et al. | 717/134 |

* cited by examiner

*Primary Examiner* — Wei Zhen
*Assistant Examiner* — Lanny Ung
(74) *Attorney, Agent, or Firm* — Womble Carlyle Sandridge & Rice LLP; Jeffrey R. McFadden (57) ABSTRACT

A method, system and computer-readable media for analyzing application environments is provided. Embodiments of the invention includes generating a first representation of a first environment for an application and a second representation of a second environment for the application. Determining differences between the first representation and the second representation and determining relevance to the application of each of the differences as to a likelihood of failure of operation of the application in the second environment where at least one method operation is executed through a processor.

20 Claims, 7 Drawing Sheets

| Classification | Sub Classification | Object | Source know to work | Target under modification | Different id Binary | Scale of Impact | Relevance (Risk) |
|---|---|---|---|---|---|---|---|
| File | Never opened | Filenamexxx | Closed | Closed | 0 | 0 | NA |
| | Opened during boot | Filenamexxx | Open | Open | 0 | 1 | Low |
| | Open on source | Filenamexxx | Open | Closed | 1 | 4 | High |
| | Closed on source | Filenamexxx | Closed | Open | 1 | 4 | High |
| Memory | Size= | host1/host2 | 1024k | 1024k | 0 | 0 | NA |
| | Size< | host1/host2 | 1024k | 512k | 1 | 4 | High |
| | Size> | host1/host2 | 1024k | 2048k | 1 | 1 | Low |
| Storage | Disk | Host1Lun#/Host2Lun# | thick | thick | 0 | 0 | NA |
| | Disk | Host1Lun#/Host2Lun# | thick | thin | 0 | 2 | Medium |
| | Disk | Host1Lun#/Host2Lun# | thin | thick | 1 | 2 | Medium |
| Operating system | OS Level | host1/host2 | WIN 7 64 bit | WIN 7 32 bit | 1 | 4 | Critical |
| | Patch Level | Host1/host2 | xx.yy | xxx.yyy | 1 | 4 | Critical |
| | ASCII File | File1/File2 | Exist, same check sum | Exist, same check sum | 0 | 0 | NA |
| | ASCII Name Value Pair | File1/File2 | Exist | Exists, Diff check sum | 1 | 4 | Critical |
| | ASCII Name Value Pair | File1/File2 | Does not exist | Exist | 1 | 1 | Low |
| | ASCII Name Value Pair | File1/File2 | Exists | Does not exist | 1 | 4 | Critical |
| | ASCII Name Value Pair | File1/File2 | Exists | Exist, diff check sum due to comments/blank lines | 1 | 1 | Low |

| Classification | Impact | Count |
|---|---|---|
| System | High | 26 |
| | Medium | 62 |
| | Low | 100 |
| | No Impact | 212 |

| Classification | Impact assessment | Count |
|---|---|---|
| File | High | 7 |
| | Medium | 17 |
| | Low | 24 |
| | No Impact | 96 |
| Memory | High | 8 |
| | Medium | 12 |
| | Low | 36 |
| | No Impact | 45 |
| Storage | High | 2 |
| | Medium | 11 |
| | Low | 17 |
| | No Impact | 24 |
| Operating system | High | 9 |
| | Medium | 22 |
| | Low | 23 |
| | No Impact | 47 |
| Network | High | 12 |

| Object | Action | Operation in source environment | Operation in target environment | Difference | Impact assessment |
|---|---|---|---|---|---|
| Filename 1 | Never opened | Closed | Closed | 0 | No impact |
| Filename 2 | opened during boot | Open | Open | 0 | Low |
| Filename 3 | Update | Open | Closed | 1 | High |

| Classification | Object | Action | Operation in source environment | Operation in target environment | Difference | Impact assessment |
|---|---|---|---|---|---|---|
| File | Filename 12 | Never opened | Closed | Doesn't exist | 1 | High |
| File | Filename 21 | opened during boot | Doesn't exist | Open | 1 | High |
| File | Filename 33 | Update | Open | Closed | 1 | High |

COMPUTING ENVIRONMENT ANALYZER

BACKGROUND

A Software Development Life Cycle (SDLC) environment poses many challenges to a Release Integration Team. A consistent problem frequently occurs when Development releases code to a target environment, for example QA (Quality Assurance), Staging or Production, and the code fails to run properly in the new target environment. The software code runs well in the Development Environment, but fails to run in a different computing environment, e.g., a Production Environment. This common situation creates a lot of time consuming "churn" between the Development team and the Release Integration Team, as differences in computing environments are often very difficult to identify. The problem is further exacerbated in an organization where some of the environments are virtualized, meaning they are running in a logical computing environment as opposed to a physical computing environment. There are different types of computing environments that support the business, such as Development environments, QA environments, Staging environments, and Production environments. The computing needs of each of these organizational business units can be supported by either a physical, a logical, or a combination of both physical and logical computing environments.

The problem can arise from many different possibilities of code and environmental sources in the Development, QA, Staging and Production environments. Examples of different sources include libraries, plug-ins, open source tools, commercial tools, locally grown code, installed application packages, Operating System release versions, and machine configuration parameters, which can include memory footprint, application configuration settings, or system tuneables. The time it takes to resolve these incompatibilities has a negative impact on the productivity of the Release Team personnel as resolving the incompatibilities is predominantly a manual process. The manual process slows down product release and is friction to the efficiency of the needs and objectives of the business.

SUMMARY

In some embodiments, a method, system and computer readable media for analyzing application environments is provided. It should be appreciated that application environments include the entire stack of compute resources, including processor, memory, network, storage, hypervisor, Operating system, etc. An embodiment of the invention includes generation of a first representation of a first environment for an application and a second representation of a second environment for the application. This embodiment further includes determining differences between the first representation and the second representation and determining relevance to the application of each of the differences as to a likelihood of failure of operation of the application in the second environment where at least one embodiment of the invention is implemented using a computer system having processor.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

DETAILED DESCRIPTION

A computing environment analyzer, which may be referred to as an intelligent virtual image processor (IVIP) in some embodiments, analyzes computing environments for a software application, and determines differences between or among the environments. The computing environment analyzer then determines relevance of these differences, in terms of the impact each of the differences could have on the likelihood for successful operation or failure of operation of the application in the various environments. The computing environment analyzer and related embodiments serve to highlight differences in computing environments that potentially can lead to problems, so that these differences and potential problems can be resolved in an organized and efficient manner. The computing environment analyzer is useful in SDLC environments, particularly when transferring an application from one environment to another. By leveraging the computing capability of a computing device, the computing environment analyzer quickly identifies differences between source and target environments. The computing environment analyzer, when executing the functionality described herein, highlights and ranks differences between the two environments in some embodiments to accelerate the process of identifying meaningful differences and assessing the likely impact of the identified differences. In this way, the computing environment analyzer reduces the risk associated with moving new applications into a production environment, potentially allowing organizations to more frequently or rapidly move applications and/or updates into a new environment such as a production environment as will be described further below.

As an example, suppose new code, an update, etc., functions properly in a developer's environment but issues may occur in the QA, Staging, and or Production environments, which cause the continuous integration builds to fail. Such unknown computing environment differences or factors creates a lot of "churn" in "man hours" to discover which environmental factors caused the new code to fail to operate properly when migrated from a source to a target computing environment. The problem could be a misconfiguration of a network driver, the overloading of kernel modules in the environment, or inconsistent firewall routing rules, etc., to name a few. The computing environment analyzer provides concise information that can lead to solutions to the issues and problems, thereby making the migration process more efficient while providing a high degree of confidence for a success in the new target environment. In some embodiments, the computing environment analyzer supports decision making processes by assigning levels or risk. This provides a level of certainty and confidence for those approving new code changes. The computing environment analyzer determines relevant differences in two different computing environments, and categorizes those differences for further analysis. The identified differences are categorized and the impact of each of the differences to the successful deployment of an application can be determined as part of the categorization. For example, a change in a comment in a configuration file is likely to have zero impact, whereas a firewall rule that blocks a certain port is likely to have a significant impact. The computing environment analyzer presents the differences in a model that allows IT (Information Technology), Development and Operations staff or teams to quickly identify meaningful changes and take necessary remedial action. The computing environment analyzer may create a machine readable/machine consumable file for automation of syncing two environments, e.g., where a change is propagated across different environments. The measured differences, the proposed remediation and the final differences can be archived for forensic analysis. The computing environment analyzer can also be used to determine whether two environments are identical or closely similar in some embodiments.

Figure 1:
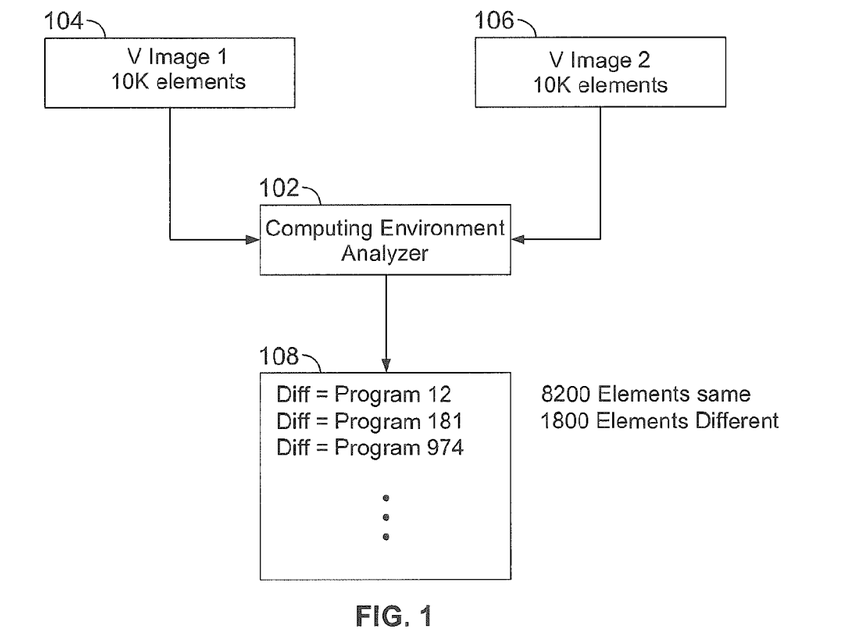
FIG. 1 is a schematic diagram of a computing environment analyzer that analyzes differences in computing environments, in accordance with some embodiments.

FIG. 1 shows an embodiment of the computing environment analyzer 102 comparing a first computing environment 104 for an application and a second computing environment 106 for the application. An application as used herein can include a portion of an application or software code for a driver, etc. In a typical operating scenario, the application (code or software) is operational in the first environment 104, and a software development team is preparing to release the application, i.e., release the software code or application, to another team that controls or operates the second environment 106. For example, in a SDLC operation, a release integration team coordinates with the release management teams, such as a development team, a quality assurance team, a staging team and a production team. Each of these teams has its own computing environment, which typically includes one or more application environments in which the application is expected to install and run, whence the application may or may not be operational. In this scenario, the development environment is a source environment and can be or include the first environment 104, and any of the environments of the teams downstream in the development process can be a target environment such as the second environment 106. In a related operating scenario, the application may not yet be operational in the first environment 104, but the teams desire to analyze differences in the computing environments in advance of further development efforts or debugging efforts. The computing environment analyzer 102 may search or categorize the elements in the first environment 104. In the example of FIG. 1, 10,000 elements are shown in a virtual image (VImage 1) of the first environment 104. The computing environment analyzer 102 also looks at the elements in the second environment 106. In this example, 10,000 elements are shown in a virtual image (VImage 2) of the second environment 106. Physical and virtual environments, and images of these, will be further discussed with regard to FIGS. 2 and 3.

Continuing with FIG. 1, the computing environment analyzer 102 executes instructions that causes the computing environment analyzer to compare elements of the first environment 104 with elements of the second environment 106, and generates an environmental difference 108. The environmental difference 108 can be embodied as a list, table, file or other data output, residing in a memory and subsequently a historical file on physical media. In the example shown, of the 10,000 elements compared between the first and second environments 104, the computing environment analyzer 102 found 8200 elements the same and 1800 elements different. These 1800 differing elements are listed in the environmental difference 108. Environmental difference 108 depicts that differences were detected in the operation of programs 12, 181, and 974 when running in the first and second environments. These detected differences are illustrated as Diff=program 12, Diff=Program 181, and Diff=Program 974 in this embodiment. It should be appreciated that the embodiment of FIG. 1 is one example and not meant to be limiting as static environment comparisons, as well as dynamic environment comparisons, may be performed by the computing environment analyzer 102. Elements of, and differences between, computing environments will be further discussed with regard to FIGS. 4-8.

Figure 2:
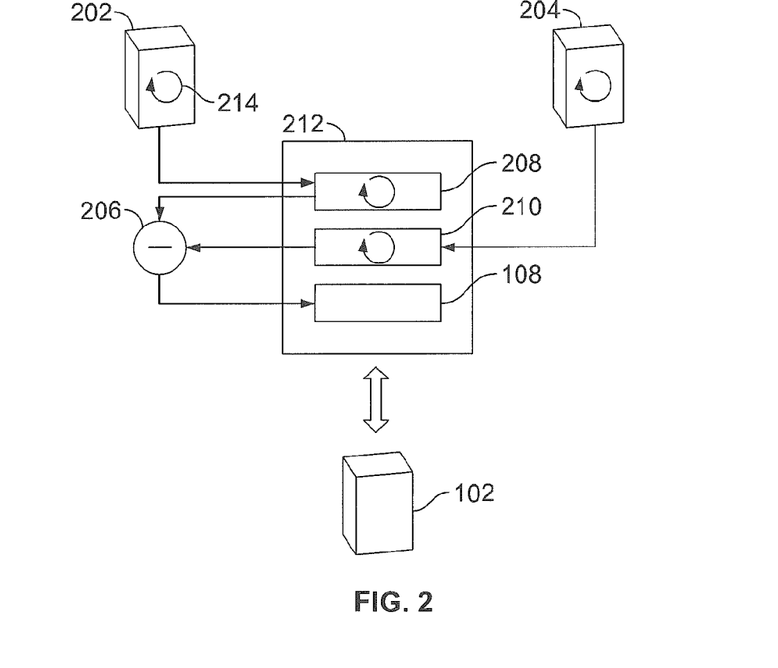
FIG. 2 is a schematic diagram of an embodiment of the computing environment analyzer of FIG. 1.

FIG. 2 shows an embodiment of the computing environment analyzer 102 that can work with either physical environments or virtual environments in accordance with some embodiments. An application 214 is shown operating in the first environment 202. The first environment 202 is a physical computing environment in some embodiments, which could be included in a computing device such as a personal computer, laptop, a computing device, a server, a smart phone, tablet, blades, rack mount server, switches, storage environments, and so on. The application 214 could be any software being considered for release, such as a device driver, a software program, a software suite, an operating system, server software, consumer software, commercial software and so on. The representation of the first environment 208 could include a copy or an image of some or all of the contents of the memory of the first environment 202. In another embodiment, the representation of the first environment 208 could be a physical to virtual conversion of the first environment 202, i.e. a physical to virtual conversion of the physical computing environment. Such a conversion results in a virtualized environment, also known as a virtualized computing environment. Under normal circumstances an application that is operational in a physical computing environment is operational in the corresponding virtualized environment. A second environment 204 is available for the application 214. The second environment is a physical computing environment in some embodiments. The representation of the second environment 210 is related to the second environment 204 in the same manner as the representation of the first environment 208 relates to the first environment 202. It should be appreciated that while the first environment 202 and the second environment 204 are embodied as physical environments, this is not meant to be limiting as the first and second environments may be virtual environments in some embodiments.

The computing environment analyzer 102 of FIG. 2 is coupled to and communicates with a memory 212, which could be internal to or external to the processor in various embodiments. Inside the memory 212 are representations of computing environment 202 in the first environment 208 and representations of computing environment 204 in the second environment 210. A difference process 206 compares the representation of the first environment 208 and the representation of the second environment 210, and generates the environmental differences 108. In some embodiments, difference process 206 may be integrated into computing environment analyzer 102 rather than being external to computing environment analyzer 102. In the example shown, the representation of the first environment 208, the representation of the second environment 210, and the environmental differences 108 are each embodied as data in the memory 212. This data could be in the form of files, tables, a database, or other data structures as readily devised. The memory 212 could be in non-volatile memory, RAM (random access memory), a hard drive, an optical drive, a combination of these or other memory as readily devised. Different scenarios are presented below to illustrate various embodiments.

A first case to consider is where both computing environments 202 and 204 to be compared are physical computing environments. Here, the computing environment analyzer 102 could communicate directly with the first environment 202 and the second environment 204, i.e., with the physical computers, and generate the environmental differences 108. In some versions, this could proceed directly from the physical environments without use of the representations of the environments, and the computing environment analyzer 102 would generate the environmental differences 108 from a comparison of the first environment 202 and the second environment 204. In other versions, this could proceed with the computing environment analyzer 102 cooperating with the physical environments to form representations of the environments 208, 210, then generating the environmental differences 108 from a comparison of the representation of the first environment 208 and the representation of the second environment 210 as discussed above.

A second case to consider is where both computing environments to be compared are virtualized. Here, the computing environment analyzer 102 could communicate with the first environment 202, and perform a physical to virtual conversion. The representation of the first environment 208 would then include the virtualized first environment. The computing environment analyzer 102 could communicate with the second environment 204, and perform a physical to virtual conversion. The representation of the second environment 210 would then include the virtualized second environment. The computing environment analyzer 102 could proceed and generate the environmental differences 108 from a comparison of the representation of the first environment 208, including the virtualized first environment, and the representation of the second environment 210, including the virtualized second environment.

A third case to consider is where the first computing environment is a physical computing environment and the second application environment is a virtualized computing environment. Here, the computing environment analyzer 102 could communicate with the first environment 202 and place a copy or image of the first environment 202 in the representation of the first environment 208. The computing environment analyzer 102 could communicate with the second environment 204, and perform a physical to virtual conversion. The virtualized second environment would then be placed or copied into the representation of the second environment 210. The computing environment analyzer 102 could proceed and generate the environmental differences 108 from a comparison of the representation of the first environment 208, including the copy or image of the first environment 202, and the representation of the second environment 210, including the virtualized second environment. In a further embodiment, the computing environment analyzer 102 could use information directly from the first environment 202, bypassing the representation of the first environment 208.

A fourth case to consider is where the first computing environment is a virtualized computing environment and the second application environment is a physical computing environment. Here, the computing environment analyzer 102 could communicate with the first environment 202, and perform a physical to virtual conversion. The virtualized first environment would then be placed or copied into the representation of the first environment 208. The computing environment analyzer 102 could communicate with the second environment 204, and place a copy or image of the second environment 204 in the representation of the second environment 210. The computing environment analyzer 102 could proceed and generate the environmental differences 108 from a comparison of the representation of the first environment 208, including the virtualized first environment, and the representation of the second environment 210, including the copy or image of the second environment 204. In a further embodiment, the computing environment analyzer 102 could use information directly from the second environment 204, bypassing the representation of the second environment 210.

Figure 3:
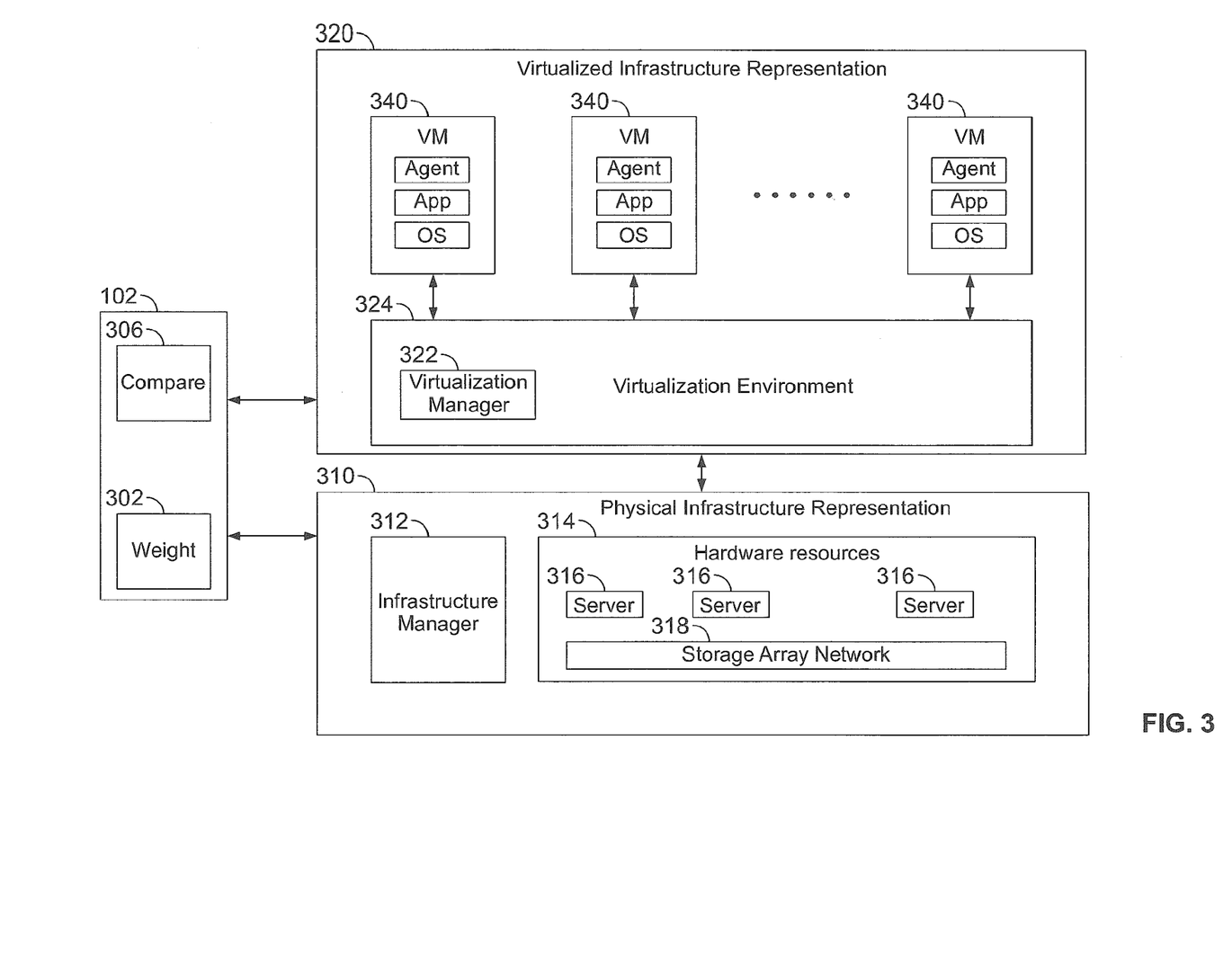
FIG. 3 is a more detailed schematic diagram of an embodiment of the computing environment analyzer of FIGS. 1 and 2.

FIG. 3 shows a further embodiment of the computing environment analyzer 102, which interacts with virtualized infrastructure representation 320 and physical infrastructure representation 310. The system shown in FIG. 3 can perform physical to virtual conversion of physical computing environments, and support or host virtual machines 340 in the virtualized infrastructure representation 320, and could be used to emulate hardware resources 314 in the physical infrastructure representation 310 as is well known to those of skill in the art. The hardware resources 314 include one or more servers 316, and a storage array network 318. The server 316 and storage array network 318 are overseen by an infrastructure manager 312. Infrastructure manager 312 is configured to manage the configuration, provisioning, and policy compliance of the physical infrastructure representation 310. Infrastructure manager 112 provides an interface by which provisioning of hardware resources (e.g., computing, networking, storage) may be managed with policy-based automation in accordance with some embodiments. According to one embodiment, the infrastructure manager 112 may be included in every physical infrastructure representation 310 to manage the configuration, provisioning, and compliance of computing-block based infrastructure. It should be appreciated that all of the devices in the physical infrastructure representation 310 are physical devices such as computing devices, memories, buses, networks, etc., and that these physical devices collectively support the virtualized infrastructure representation 320 and virtual machines 340. Each virtual machine 340 can have an operating system (OS), one or more applications (APP) and an agent (AGENT). In some implementations, one or more of the virtual machines 340 can connect to one or more users by a communications network.

A virtualization manager 322 of the virtualization environment 324 establishes and oversees the virtual machines 340. The virtualization manager 322 can dynamically allocate resources among the virtual machines 340. In some embodiments, the physical infrastructure 310 can be implemented with a Vblock® System available from the VCE Company LLC of Richardson, Tex. The virtualization manager 322 can be implemented with the VMware vCenter virtualized management platform available from VMware, Inc., of Palo Alto, Calif. in some embodiments. A virtualized environment can be implemented in the virtualization environment 324 using VMware vSphere or VMware ESX-based hypervisor technologies on servers in some embodiments. In some embodiments, hardware resources 314 may be clustered and in other embodiments, virtualized clusters may exist in virtualization environment 324. It should be appreciated that the embodiments described herein may be extended to any virtualized environment/hypervisor and are not limited to a VMware ESX-based hypervisor in this example.

Continuing with FIG. 3, the computing environment analyzer 102 communicates with the virtualized infrastructure representation 320 and/or the physical infrastructure representation 310. The computing environment analyzer 102 has a comparison module 306 that generates a comparison of the first environment and the second environment, and stores the comparison in memory. For example, the comparison module 306 could implement the difference process 206 as shown in FIG. 2 in some embodiments. The comparison module 306 generates differences between the first environment and the second environment. In some embodiments, these differences include static environment comparisons between the first environment and the second environment. For example, generating the differences could be accomplished by performing a directory difference on a physical machine disk, a virtual machine disk, or a combination of these. In this example, the source environment and the target environment reside at least in part on the physical machine disk, the virtual machine disk or on some combination of these. It should be appreciated that performing a directory difference across files relating to the source environment and the target environment reveals differences between these environments. A directory difference can be performed prior to executing the application in either of the environments, which provides a static comparison. In other embodiments, a directory difference can be performed after executing the application in each of the environments, which provides another static comparison. Static comparisons show differences in dynamic link libraries (DLLs) or other libraries, settings, configurations, files, file names, file contents and so on. In one embodiment, static comparisons are performed using directory differences or directory scans across VMDK (virtual machine disk) files which represent virtual disks for virtual machines as allocated from physical resources. In some embodiments, static comparisons are performed using directory differences or directory scans across any virtual machine disk files and are not limited to VMDK files. In further embodiments, static comparisons are performed by taking a difference across configuration files, or registry files, or registries, between two different environments.

In some embodiments, the comparison module 306 of FIG. 3 performs a dynamic footprint comparison of the first environment and the second environment. Here, the differences between the environments can be generated by comparing runtime logs, runtime traces or debugger traces, from booting up an operating system, executing the application or applications, introducing resources, and various combinations of these in both the source environment and the target environment. For example, if the application is run as part of a website, a trace is performed for powering up a server all the way up to the point at which the webpage is accessed in order to view the pre-access environment. Alternatively, the trace is performed from the point at which the webpage is accessed and onward, and so on. Dynamic footprint comparisons show what resources are consumed or generated, e.g., files, ports or other resources, such as memory, that get accessed, read or written to during operation of the application. In some embodiments, the dynamic footprint comparison uses VMX (virtual machine extension) files that identify what resources get touched during operation of the application in each of the environments.

A weighting module 302, in FIG. 3, is included in the computing environment analyzer 102. The weighting module 302 weights the differences between the first and second environments, with these differences being based on the comparison performed by the comparison module 306. A set of rules, with weights for various factors that could be found as differences between environments, could be applied by the weighting module 302 in one embodiment. Such weights serve to quantify each difference as to risk or impact on the application. Various rule sets, weighting schemes, scales and factors can be devised, and these can be relative to or associated with types of environments, types of applications, or specific environments and specific applications. Determining the relevance of the differences to the application is rule-based in some embodiments. In one embodiment, the weighting module 302 organizes the differences as to scale of impact, risk levels or risk relevance. In another embodiment, the weighting module 302 and the comparison module 306 cooperate to so organize the differences. It should be appreciated that weighting module 302 and comparison module 306 may be integrated into computing environment analyzer 102 or be external to computing environment analyzer 102.

Thus, the system shown in FIG. 3 can establish and support a source environment for an application, and a target environment, and analyze the differences between the environments. The environments can be virtual environments in some embodiments. If physical environments or some combination of physical and virtual environments are to be analyzed, an embodiment based on FIG. 2 or a combination of features from FIG. 2 and FIG. 3 could be utilized. Portions or all of the comparison module 306 and/or the weighting module 302 could be implemented in software, firmware or hardware or combinations thereof, and could be implemented separately from or integrated into the physical infrastructure representation 310 or the virtualization manager 322, in various embodiments.

FIGS. 4-8 show examples of user readable reports, which can be displayed as a graphical user interface, representing the environmental differences 108. As discussed regarding FIG. 2, the environmental differences 108 could be in the form of various data structures. The environmental differences 108 could reside in memory or be output as a file, formatted for a display or as hard copy, or be in some other format as readily devised.

Figure 4:
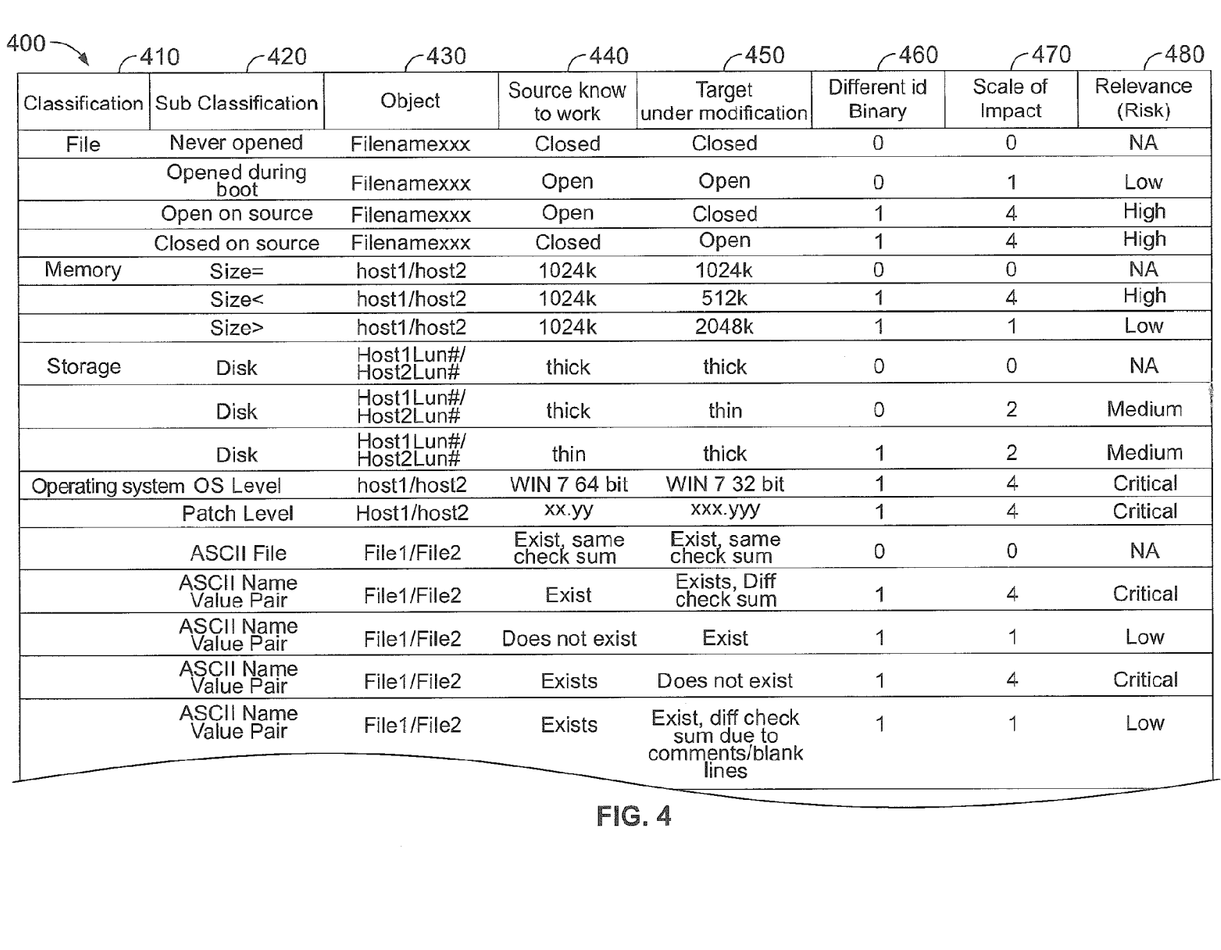
FIG. 4 is an example output table from the computing environment analyzer of FIGS. 1-3, showing differences between a source environment and a target environment according to one embodiment of the invention.

FIG. 4 is a table 400, listing objects and attributes of each object as compared between a source environment and a target environment according to one embodiment of the invention. The objects are in various classifications 410 and sub classifications 420. For each object 430, a differential 460 is listed as "0" if the object is not different in the two environments and "1" if the object is different in the two environments. For each object, a scale of impact 470 lists a number from "0" through "4", as an assessment or estimate of how little or how much the difference for the object in the two environments could affect the application in the target environment as will be further described below. For each object, a relevance or risk 480 is listed as "NA" (not applicable), "Low", "Medium", "High" or "Critical" as an assessment or estimate of how the difference for the object in the two environments could affect the likelihood of successful operation or failure of operation of the application in the target environment. Other scales, categories of scales, categories of assessment, categories of estimates, types of risk, types of relevance and so on are readily devised. Table 400 could be displayed in a graphical representation, as could the various reports described below.

One classification of objects 430 in the table 400 is "File". In this example, the computing environment analyzer searches for files that are never open (remain unopened), are open during boot, are open on the source environment or are closed on the source environment. One classification 410 of objects is "Memory". The computing environment analyzer looks for memory size differences. One classification 410 of objects is "Storage". The computing environment analyzer looks for disk or other storage differences. One classification of objects is operating system. The computing environment analyzer looks for differences in operating system level, patch level, files that have checksums or exist or do not exist. Columns 440 and 450 provide some example attributes for the objects 430 in the source environment and target environment, respectively. Other examples of classifications of objects, and objects belonging to such classifications, are described below and/or are readily devised.

Figure 5:
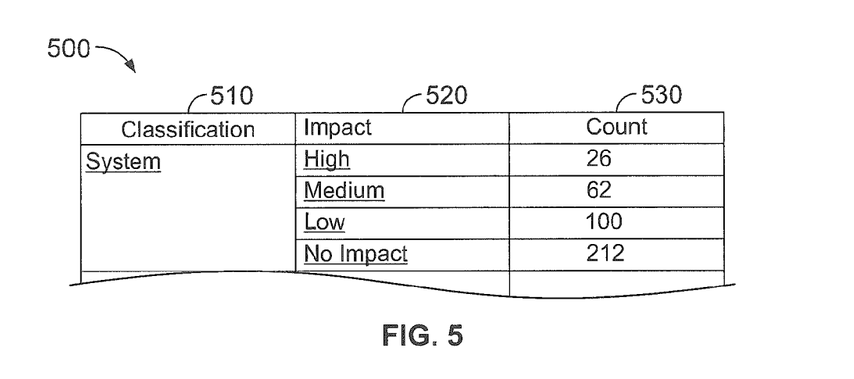
FIG. 5 is an example summary report, derived from the output table of FIG. 4 according to one embodiment of the invention.
Figure 6:
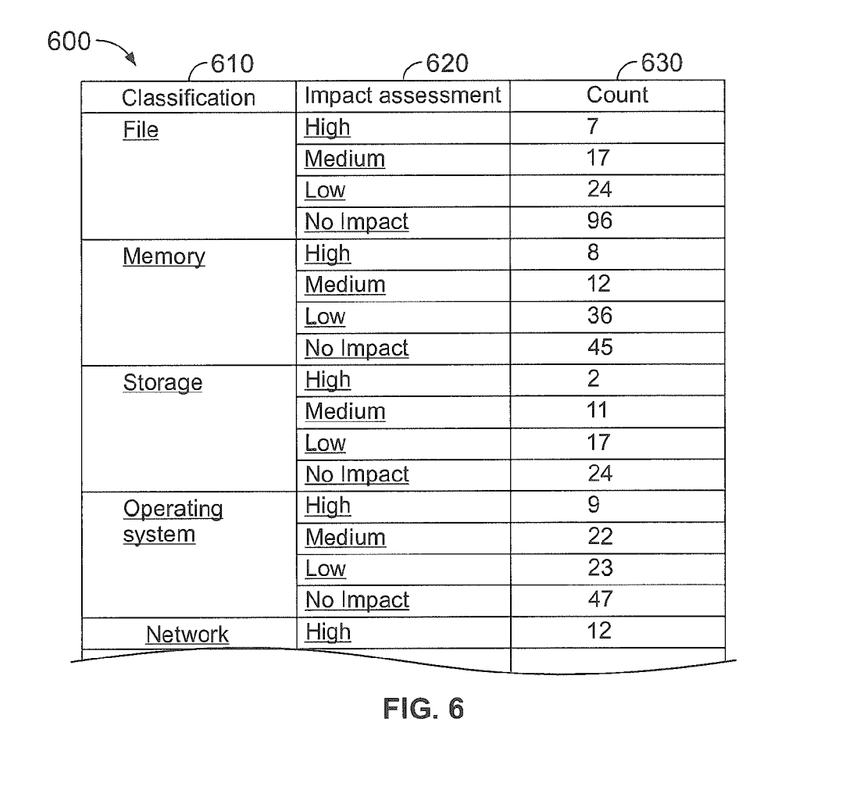
FIG. 6 is an example system category report, derived from the summary report of FIG. 5 and the output table of FIG. 4 according to one embodiment of the invention.

FIG. 5 shows a summary report 500 according to one embodiment of the invention. The summary report 500 summarizes results from the table 400. For example, the summary report 500 could show the impact assessment 520 and a corresponding count 530 of high, medium, low or no impact objects for a classification 510 from the list of differences found between the two environments, and associated count numbers. Other classifications 510 could be added to the summary report 500. In one embodiment, the summary report 500 is displayed as a graphical representation, and a user can click on various sections of the summary report 500 to display further details. For example, clicking on the word "System" in the summary report 500 brings up the system category report 600 as shown in FIG. 6. In this report, the classification column 610 breaks out aspects of the system, including "File", "Memory", "Storage", "Operating System", and "Network". Each of these categories has an impact assessment 620 of corresponding objects from the list of differences found between the two environments, and associated count numbers 630. A user can click on various sections of the system category report 600.

Figure 7:
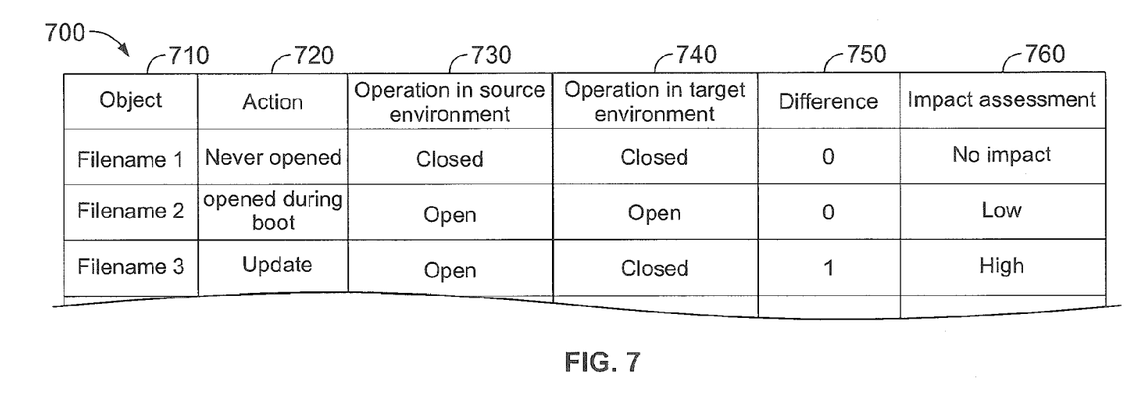
FIG. 7 is an example file category report, derived from the system category report of FIG. 6 and the output table of FIG. 4 according to one embodiment of the invention.

For example, clicking on the word "File" in the system category report 600 brings up the file category report 700 as shown in FIG. 7. In this report 700, the classification "File" of FIG. 6 is further detailed providing the object 710, particularly specific files and the associated filenames. For each object 710, an "Action" category 720 shows whether the file is never opened, i.e., is unopened, opened during boot, or updated. each file, The operation in the source environment 730 and the operation in the target environment 740 provides the status of the corresponding filename as being closed or open. A difference 750 and an impact assessment 760 are also listed. Other classifications 610 from FIG. 6 can generate related reports. Such reports, pertaining to a classification of differences, and presenting data under such a classification, are referred to as orthogonal views of the data.

One example of a classification set includes system, file, memory, storage, and operating system environments. Each member of this set could have an orthogonal view of the differences data. For example, the classification of "operating system environment" could have an orthogonal view showing differences in operating system environment between the first environment and the second environment. The classification of "File" is discussed above regarding FIG. 7. The classification of "memory" could have an orthogonal view showing differences in memory between the first environment and the second environment, and so on.

Another example of a classification set includes organizational classifications such as security, database, networking, compute server, business logic, finance, and site stability. Each member of this set could relate to an organization and have a respective orthogonal view of the differences data. For example, the classification of "security" could have an orthogonal view showing differences in security patches to operating systems between the two environments. The classification of "host" could have an orthogonal view showing differences in host computers for the two environments. The classification of "networking" could show differences in network connections, network appliances, or network topology for the two environments. The classification of "storage" could show differences in storage capacity or storage types between the two environments, and so on.

Figure 8:
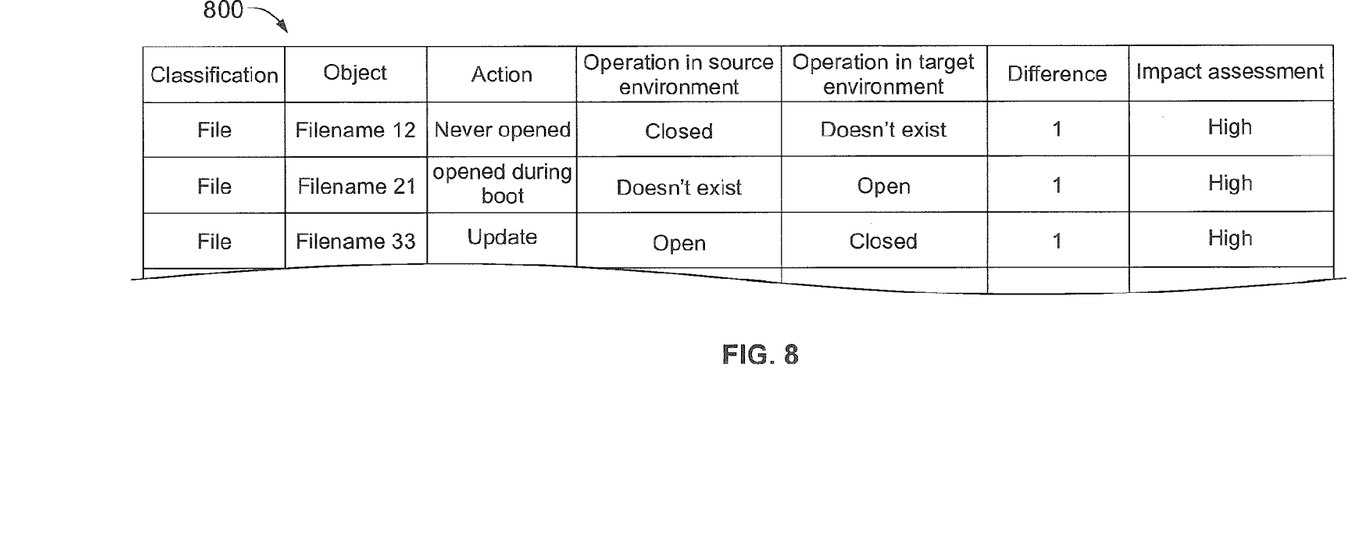
FIG. 8 is an example high-impact category report, derived from the file category report of FIG. 7 and the output table of FIG. 4 according to one embodiment of the invention.

Clicking on an entry in the "Impact assessment" column in any of reports 5-7 brings up a report showing all objects of the same type having the same level of impact, such as in the example high-impact category report 800 shown in FIG. 8. This particular report is brought up by clicking on "High" in the "Impact assessment" column across from a file that is listed, so that the object type becomes "file" with that level of impact. Other types of reports, mechanisms for navigating through screens, categories for grouping objects and so on are readily devised as well known to those of skill in the art. The columns of FIG. 8 have been described above with respect to FIGS. 4-7 and are not repeated here. It should be appreciated that numerous types of reports may be generated based on the data captured through the computing environment analyzer described herein. By generating the above-described reports or otherwise formatted data output, the computing environment analyzer can provide meaningful data for the Development Operations and Production Operations or other teams to do actionable and subsequently approvable changes to the computing environments.

In one embodiment of the invention, additional hierarchal actionable steps are performed to provide information for reconciliation and/or to automatically remediate the issues related to a failed migration of an application from a first computing environment to a second computing environment as will be described below. For example, in one embodiment the computing environment analyzer creates documentation for the approval process of changes to production environments. In some embodiments of a decision-making process, the computing environment analyzer generates reports in the form of signoff sheets. In other embodiments the report is fed into an existing decision making process or application. If the application is presently operable in the target environment, then the decision-making as to transfer can be revisited, and the rules for determining risk and criticality of such differences as found by the computing environment analyzer can be updated. If the application or code is found inoperable in the target environment, the devops team will utilize the computing environment analyzer to determine the environmental differences between the source and the target, e.g., the team having the source environment, is then responsible for debugging the application in the target environment as well as verifying that the then debugged application continues to be operational in the source environment or correcting something within the environment causing the failure. This can be accomplished using virtual environments or physical environments, as described above. It should be appreciated that the computing environment analyzer output is valuable in determining the necessary changes to bring the two environments together. When the application is shown operable in both the source environment and the target environment the rules for determining risk and criticality of differences can be updated. Alternatively, a decision can be made to rebase so that the target environment and source environment have fewer differences, i.e., are more uniform to each other.

In one embodiment, the computing environment analyzer uses a set of rules based on and/or learned from, for example, the iterative use of the computing environment analyzer to identify environmental factors related to why an application in a first computing environment might fail in a second computing environment. For example, one or more rules might be generated automatically by the computing environment analyzer or manually, based on general knowledge of the various teams involved in the Software Development Life Cycle. These factors might be based on comparing the differences between two computing environments, and weighting of the various factors as to the scale of impact, the risk level, the risk relevance, etc. In such a way, these factors could be gathered and automatically converted into a set of rule, which could then be used by a computing device, such as the computing environment analyzer as will be further described below. The devised rule set may also be associated with a specific scale of impact factor to indicate whether a specific factor is found to be more critical or less critical for a specified application. Rule sets could be general to all applications in a category, or specific to one application, specific to an environment, or even to one release of one application. In a further embodiment, the rulemaking is automated through the use of a learning system using artificial intelligence and a database of operating environments with historical data relating to applications to determine specific factors that might induce or predict why an application might not migrate properly from a first computing environment to a second computing environment.

With rule updating, rule sets can evolve. A general rule set could spawn application-specific rule sets, which could then spawn release-specific rule sets. For example, in one rule set a difference in operating system or operating system patch level could initially be flagged as high-impact or critical. Then, a test run of the application in both the source environment and the target environment, with differing levels of operating system or operating system patches, could show that the application is operational in both environments. The rule set would then be updated to show that this difference in operating system or operating system patch level has zero or very low level risk, or is not critical. In one embodiment, when the computing environment analyzer generates a report or signoff sheet based on the updated rules, the difference could still be flagged but would be shown at the updated risk or criticality level. Similarly, a difference in environments that is flagged as low risk or low criticality might be shown in tests to be much more critical than originally thought. This could occur when the application is operational in the first environment, but upon executing the application in the second environment a failure is observed. When the computing environment analyzer shows the differences between the two environments to have only low-impact or low criticality, but such a failure is observed, the rules would then be updated to show high-impact or high criticality for the differences in a manual or automated update process. A newly generated report or signoff sheet would reflect this change in the rules. In a further embodiment, rule updating or evolution could be automated using artificial intelligence and results of beta testing.

Rebasing includes process of recursively applying the delta changes highlighted by the computing environment analyzer can keep environments up-to-date. In some embodiments rebasing automatically updates the target systems. An example of rebasing is issuing updates to operating systems so that the source and target operating environments have the same level of operating system or operating system patches. A decision of whether or not to rebase could be made in response to identifying a lack of uniformity in the source and target environments. For example, this could occur if there are too many differences between the environments or if differences are critical. Rebasing can include notifications to operators of systems, or automated patches or distributions to the systems, or combinations thereof.

In one embodiment, the process of recording, or logging, changes to a computing environment to a change log is performed to provide an historical record. In this way, the change log can be consulted or processed for information about environmental differences between an earlier environment and a later environment. Where an application is demonstrated to be operational across multiple changes, the differences between the earlier environment and the later environment are demonstrated to be noncritical. Where an application is demonstrated to be nonoperational after a change, the difference in the environments is demonstrated to be critical. Information as to criticality of changes or environmental differences can be used to update the rule set, or can guide a decision to rebase. Regression testing is also supported with the historical output of earlier environments. It should be appreciated that the same environment can be tested between two different periods of time.

Figure 9:
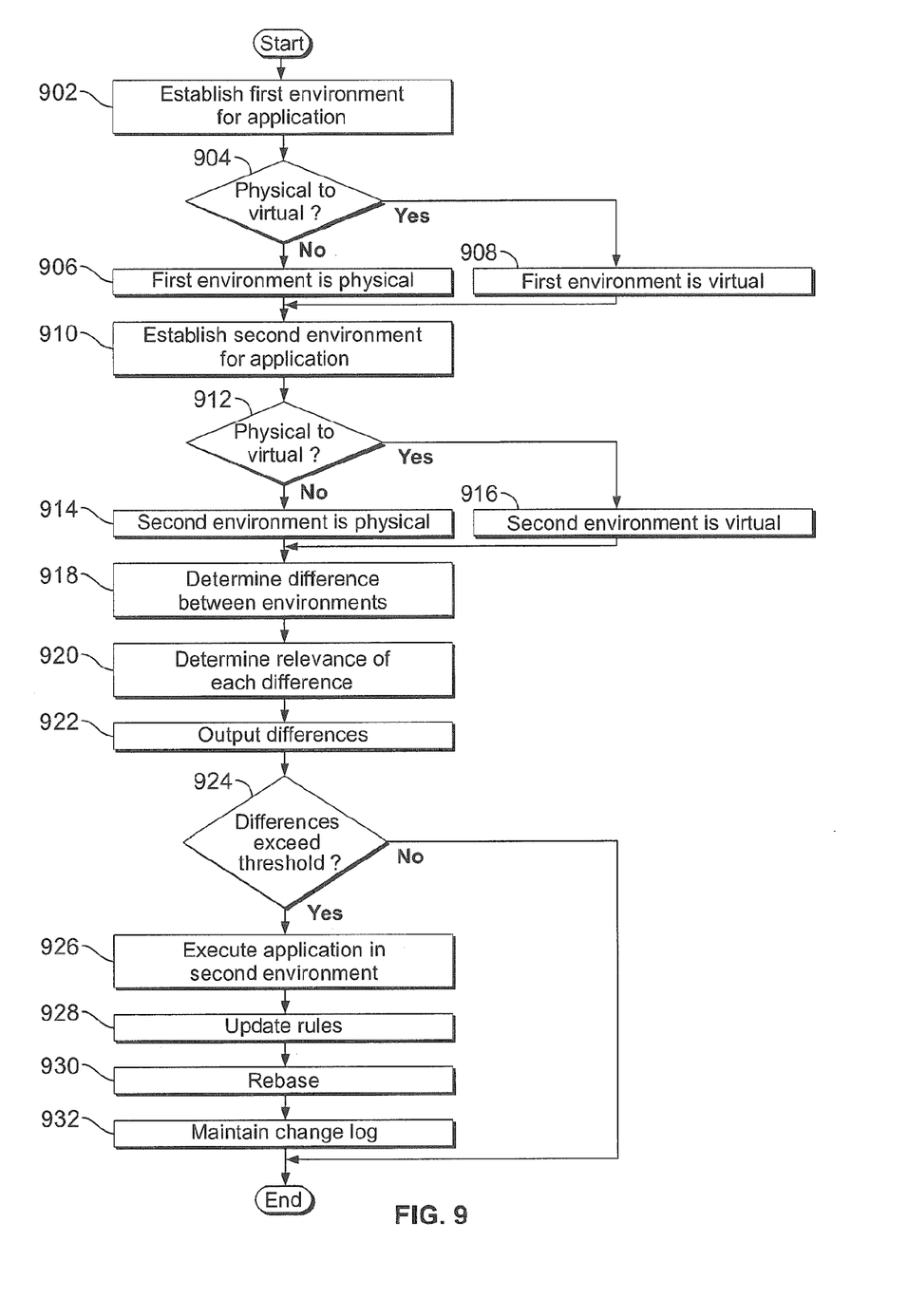
FIG. 9 is a process flow for analyzing application environments, which can be practiced on the computing environment analyzer of FIGS. 1-3 or variations thereof according to one embodiment of the invention.

FIG. 9 illustrates a process flow 900 for analyzing application environments. Embodiments of the flow can be practiced by the computing environment analyzer as described above in conjunction to the descriptions of FIGS. 1-3. As is well known in the art, a specially programmed computer could execute instructions causing the functionality described in one or more steps of the method.

After a start point, the first environment is established for an application, in an action 902. For example, a source environment could be established as a physical computing environment for an application, using the first environment of FIG. 2. The application could be debugged and operational in the first environment. Alternatively, a virtual environment could be established for the application, using the virtualized infrastructure as supported in the physical infrastructure of FIG. 3. In a decision action 904, it is determined whether there should be a physical to virtual conversion. If there should not be a physical to virtual conversion then the first environment is physical, as declared in an action 906. If there should be a physical to virtual conversion, then the first environment is virtual, as declared in an action 908. For example, a physical to virtual conversion could be carried out using the system of FIG. 2 or the virtualized infrastructure and physical infrastructure of FIG. 3.

A second environment is established for the application, in an action 910 of FIG. 9. For example, a target environment could be established as a physical computing environment for the application, using the second environment of FIG. 2. Or, a virtual environment could be established for the application, using the virtualized infrastructure as supported in the physical infrastructure of FIG. 3. The application might or might not have been tried on the second environment. In a decision action 912, it is determined whether there should be a physical to virtual conversion. If there should not be a physical to virtual conversion then the first environment is physical, as declared in an action 914. If there should be a physical to virtual conversion, then the first environment is virtual, as declared in an action 916. As mentioned above, a physical to virtual conversion could be carried out using the system of FIG. 2 or the virtualized infrastructure and physical infrastructure of FIG. 3.

The method of FIG. 9 then advances to operation 918, where differences are determined between the representations for the two environments. For example, the difference process determines differences between the representation of the first environment and the representation of the second environment as shown in FIG. 2. As a further example, the comparison module is applied to the virtual machines as discussed with reference to FIG. 3. It should be appreciated that the representations for the first and second environment may be generated prior to determining the differences in action 918 in some embodiments. Relevance of each difference is determined, in an action 920. For example, the weighting module operates on the differences as determined by the comparison module as discussed in FIG. 3. Alternatively, the weighting module operates on the environmental difference as determined by the difference process. The weighting module could apply rules in a rule-based operation in some embodiments. The differences are output, in an action 922. The differences between the first environment and the second environment could be output, for example, in one or more files, or tables or charts such as those shown in FIGS. 4-8.

In a decision action 924, it is determined whether the differences exceed a threshold value. The threshold value could be a predefined threshold such as a predefined or predetermined total count number, a predefined count number in a particular category or level of risk, a particular type or category of differences having any entries of all, or other threshold as readily devised. If it is determined that the differences do not exceed this threshold, flow proceeds to the endpoint. It should be appreciated that in some embodiments, irrespective of the threshold value an automatic update or rebase of the target or second environment is performed. That is, decision action 924 may be optional in some embodiments. If it is determined that the differences exceed the threshold, flow continues with the action 926. In the action 926, the application is executed in the second environment. For example, the application could be executed in the representation of the second environment, in the case where the (physical) first environment is converted to a virtual environment as represented in the representation of the second environment. As a further example, the application could be executed in the second environment. The application could be executed in a virtual machine in the virtualized infrastructure of FIG. 3. At that time, it could be determined whether or not the application is operational in the second environment, i.e., in the physical second environment or the virtualized second environment. An assessment could take place as to whether objects that differed between the first environment and second environment really did turn out to be critical or not, etc.

The method then proceeds to action 928, where the rules are updated. For example, rules for scale of impact, relevance, risk, and so on could be updated, as a result of findings from executing the application in the second environment. In an action 930, rebasing or automatic updating occurs. It should be appreciated that rebasing may refer to the target system being automatically updated to optimize the target environment for the application based on the evaluation of the differences by the computing environment analyzer. In some embodiments rebasing includes automatically updating the elements and/or attributes of the target system. For example, a finding that there are a large number of differences between the source environment and the target environment, or a finding that one or more differences is critical, could lead to a decision to rebase. As noted above, the automatic updating or rebasing may be performed irrespective of the number of differences between the source environment and the target environment in some embodiments. For example, updates to the operating system, operating system patches, memory requirements, or other aspects relating to the differences found are then sent out to the target environment, so that the target environment becomes rebased. In an action 932, the change log is maintained. Changes to a computing environment are logged, which provides an historical record of environmental differences. This enables automation of application deployments where differences have been demonstrated to be irrelevant in a successful deployment. After the action 932, an endpoint is reached. In further embodiments, the method could branch to a reentry point or to another method.

Figure 10:
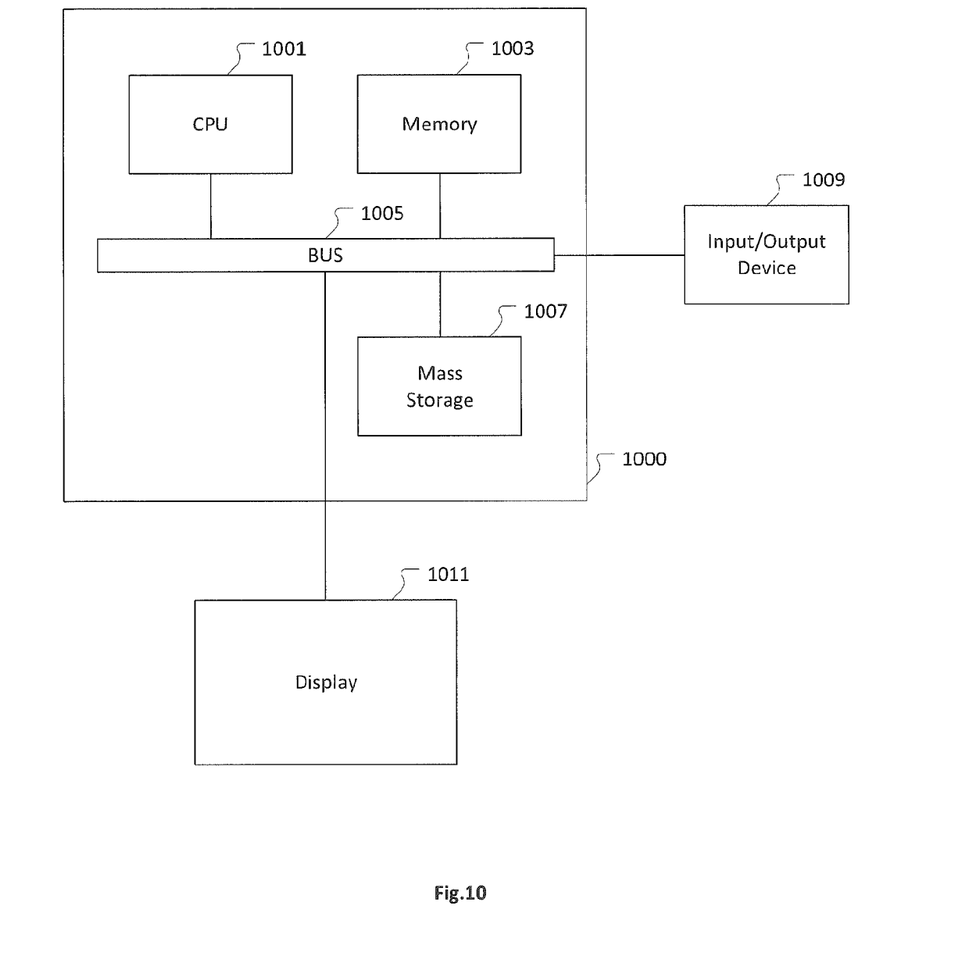
FIG. 10 is a diagram of a computing device that may execute functionality described herein in some embodiments.

It should be appreciated that the methods described herein may be performed with a digital processing system, such as a conventional, general-purpose computer system. Special purpose computers, which are designed or programmed to perform only one function may be used in the alternative. FIG. 10 is an illustration showing an exemplary computing device which may implement the embodiments described herein. The computing device 1000 of FIG. 10 may be used to perform embodiments of the functionality for the computing environment analyzer in accordance with some embodiments. The computing device 1000 includes a central processing unit (CPU) 1001, which is coupled through a bus 1005 to a memory 1003, and mass storage device 1007. Mass storage device 1007 represents a persistent data storage device such as a fixed disc drive, a digital video disk drive, a compact disk drive, etc., which may be local or remote in some embodiments. Memory 1003 may include read only memory, random access memory, etc. Applications resident on the computing device 1000 may be stored on or accessed via computer readable media or medium such as memory 1003 or mass storage device 1007 in some embodiments. Applications may also be in a form that is accessed via a network modem or other network interface of the computing device 1000. It should be appreciated that CPU 1001 may be embodied in a general-purpose processor, a special purpose processor, or a specially programmed logic device in some embodiments.

Display 1011 is in communication with CPU 1001, memory 1003, and mass storage device 1007, through bus 1005. Display 1011 is configured to display any visualization tools or reports associated with the system described herein. Input/output device 1009 is coupled to bus 1005 in order to communicate information in command selections to CPU 1001. It should be appreciated that data to and from external devices may be communicated through the input/output device 1009. CPU 1001 can be defined to execute the functionality described herein to enable the functionality described with reference to FIGS. 1-9. The code embodying this functionality may be stored within memory 1003 or mass storage device 1007 for execution by a processor such as CPU 1001 in some embodiments. The operating system on the computing device 1000 may be MS DOS™, MS-WINDOWS™, OS/2™, UNIX™, LINUX™, or other known operating systems.

Various embodiments of the computing environment analyzer make the migration of software from a first computing environment to a second computing environment much more efficient. The computing environment analyzer when executing instructions to cause the functionality described above identifies differences between a source computing environment (e.g., an environment for developers) and a target computing environment (e.g., an environment where the production software is running). The computing environment analyzer collects, stores, and categorizes the impact of each of the differences between the environments in such a way that it might be quickly determined whether the application can be successfully deployed in the target environment. If the risk of failure in the new environment is considered to be "too high", the computing environment analyzer could be used to rapidly reconcile and address critical differences between the two environments.

Embodiments of the computing environment analyzer perform various combinations of the following tasks. The computing environment analyzer intelligently compares the difference between two virtual environments. A physical computing environment can be converted to a virtualized environment (P2V) for comparison. The computing environment analyzer intelligently processes the differences, categorizing them and assigning scale of impact and relevance. In one embodiment, the computing environment analyzer presents the differences in a manner that enables Information Technology, Development and Operations staff and deployment decision-makers to quickly determine whether the differences are meaningful to the successful deployment of the application in the target environment. In one embodiment, the computing environment analyzer creates an output file with hierarchical classifications so that it can be processed for interpretation. The classifications then are highlighted and organized in a manner of scale, risk levels and risk relevance. The computing environment analyzer then presents the unique Operating Environmental Differences (S/W, Configuration Setting, Drivers, Firmware, etc.) between these two virtual images in a manner that enables risk and impact to be rapidly determined. The computing environment analyzer can also collect and store provide an historical record of environmental differences in the change log, which can enable automation of application deployments where differences have been demonstrated to be irrelevant in successful deployment. Such information might be stored long term in a storage device (e.g., a hard disk drive) as noted on FIG. 10.

In some embodiments, the computing environment analyzer compares two virtual images and creates a machine consumable file for interpretation that highlights the differences between the two environments. Many of the differences between the two environments will have no impact on successful deployment of the application in the target environment. Some differences, however, will have a meaningful impact on performance, reliability or security, and these differences should be resolved before the application is deployed to the new environment. The computing environment analyzer and its hierarchical classification of differences between two computing environments can thus reduce the risks for the Development Operations and Production Operations teams.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable media. The computer readable media is any data storage device that can store data, which can be thereafter read by a computer system. Examples of the computer readable media include hard drives, network attached storage (NAS), read-only memory, random-access memory, DVD, CD-ROMs, CD-Rs, CD-RWs, magnetic tapes, flash, and other optical and non-optical data storage devices. The computer readable media can also be distributed over a network coupled computer system so that the computer readable code is stored and executed in a distributed fashion. Embodiments described herein may be practiced with various computer system configurations including blade devices, cloud systems, converged infrastructure systems, rack mounted servers, switches, storage environments, hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, embodiments of the invention are not limited to any specific order. It should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments.

However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A computer-implemented method of analyzing computing environments, comprising:
    generating, in a memory, a first representation of a first computing environment for an application and a second representation of a second computing environment for the application, the application being of a pre-release version that is the same for both the first computing environment and the second computing environment, each of the first computing environment and the second computing environment being composed of hardware resources and software resources, the first computing environment being a development environment of the application, and the second computing environment being downstream of the development environment of the application;
    determining differences between the first computing environment and the second computing environment from a comparison of at least some of the hardware resources and software resources of the first computing environment and the second computing environment represented by respectively the first representation and the second representation; and
    determining relevance to the application of each of the differences as to a likelihood of failure of operation of the application in the second computing environment, wherein at least one method operation is executed through a processor.

2. The method of claim 1, wherein determining the differences comprises comparing the first representation and the second representation, and wherein determining the relevance to the application comprises quantifying each of the differences relative to an impact on the likelihood of the failure of operation of the application.

3. The method of claim 1, wherein determining the relevance to the application comprises generating a file with the differences organized according to at least one from a set consisting of a scale of impact, a risk level, and a risk relevance.

4. The method of claim 1, wherein generating the first representation and the second representation comprises converting a physical computing environment to a virtualized environment for one of the first environment or the second environment.

5. The method of claim 1, further comprising:
    using one or more rules relating to computing environment factors to an impact on the likelihood of the failure of operation of the application.

6. The method of claim 1, wherein determining the differences comprises a static environment comparison between the first representation and the second representation.

7. The method of claim 5, further comprising:
    updating the rules based upon one of a scale of impact, a risk level, or a risk relevance.

8. The method of claim 1, further comprising:
    wherein determining the differences comprises a dynamic footprint comparison between the first representation and the second representation.

9. The method of claim 1, further comprising:
    updating one or more environmental changes to the second computing environment for the application.

10. A computer-readable media that is non-transitory and has instructions thereupon which, when executed by a processor, cause the processor to perform a method comprising:
    establishing a representation of a source environment and a representation of a target environment, for an application that is of a pre-release version that is the same for both the source environment and the target environment, each of the source environment and the target environment being composed of hardware resources and software resources, the representations to be stored in a memory device, the source environment being a development environment of the application, and the target environment being downstream of the development environment of the application;
    determine one or more differences between the source environment and the target environment related to operability of the application, the one or more differences being determined from a comparison of at least some of the hardware resources and software resources of the source environment and the target environment represented by the representations thereof; and
    quantifying each of the one or more differences as to the operability of the application.

11. The computer-readable media of claim 10, wherein identifying the one or more differences includes performing a directory difference on a physical machine disk, a virtual machine disk, or a combination thereof, with the source environment and the target environment residing at least in part on the physical machine disk, the virtual machine disk or the combination thereof.

12. The computer-readable media of claim 10, wherein identifying the one or more differences includes comparing runtime logs, runtime traces, or debugger traces, from the source environment and the target environment.

13. The computer-readable media of claim 10, wherein the method further comprises:
    updating one or more environmental changes to the target environment for the application.

14. The computer-readable media of claim 10, wherein identifying the one or more differences includes searching in the source environment and the target environment for at least one from a set consisting of an unopened file, a file that is opened during a boot process, a file that is open on the source environment, a file that is closed on the source environment, a memory size, a storage size, an operating system level, an operating system patch level, and a checksum of a file.

15. A system for analyzing application environments, comprising:
    a memory including:
        a representation of a source environment for an application, wherein the application is operable in the source environment;
        a representation of a target environment for the application that is of a pre-release version that is the same for both the source environment and the target environment, each of the source environment and the target environment being composed of hardware resources and software resources, the source environment being a development environment of the application, and the target environment being downstream of the development environment of the application;

a comparison module operable to determine one or more differences between the source environment and the target environment, the one or more differences being determined from a comparison of at least some of the hardware resources and software resources of the source environment and the target environment represented by the representations thereof, the one or more differences being stored in the memory; and a weighting module operable to weight the one or more differences between the source environment and the target environment.

16. The system of claim 15, wherein:

the representation of the source environment is a representation of one of a physical environment or a virtual environment; and the representation of the target environment is a representation of one of a physical environment or a virtual environment.

17. The system of claim 15, wherein the one or more differences are organized in a file according a difference from a predetermined threshold.

18. The system of claim 15, wherein one of the comparison module or the weighting module is operable to output a graphical representation of the comparison illustrating the one or more differences with weights.

19. The system of claim 15, wherein the one or more differences are determined under at least one classification from a set consisting of system, file, memory, storage, and operating system environment.

20. The system of claim 15, wherein the system is operable to update one or more environmental changes to the target environment for the application.

* * * * *